United States Patent
Broer et al.

(10) Patent No.: US 6,864,933 B2
(45) Date of Patent: Mar. 8, 2005

(54) LIGHT VALVE AND DEVICE PROVIDED WITH A LIGHT VALVE

(75) Inventors: Dirk Jan Broer, Eindhoven (NL); Cornelis Antonius Van Den Heuvel, Eindhoven (NL); Gerardus Gegorius Petrus Van Gorkom, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 236 days.

(21) Appl. No.: 09/950,475

(22) Filed: Sep. 10, 2001

(65) Prior Publication Data

US 2002/0063820 A1 May 30, 2002

(30) Foreign Application Priority Data

Oct. 17, 2000 (EP) .............................................. 00203605

(51) Int. Cl.$^7$ ............................................ G02F 1/1335
(52) U.S. Cl. ...................................... 349/105; 359/291
(58) Field of Search ................................. 349/104, 105; 359/247, 290, 291, 580, 586–589, 722, 360

(56) References Cited

U.S. PATENT DOCUMENTS

| | | | | |
|---|---|---|---|---|
| 4,723,834 A | * | 2/1988 | Van de Venne et al. | .... 359/223 |
| 5,463,492 A | * | 10/1995 | Check, III | ................... 359/296 |
| 5,754,343 A | | 5/1998 | Arnold et al. | ............... 359/578 |
| 6,031,653 A | * | 2/2000 | Wang | ........................... 359/247 |
| 6,384,953 B1 | * | 5/2002 | Russell et al. | ............... 359/245 |

FOREIGN PATENT DOCUMENTS

EP 0250742 A1 7/1988 ............. F41H/3/02

* cited by examiner

Primary Examiner—Chandra Chaudhari

(57) ABSTRACT

A light valve for controlled transmission of light comprises first and second elements at least one of which is controllably movable into optical contact with the other element. Means are provided for projecting light on the first of the two elements on the side remote from the second of the two elements. Each facing side of the elements is provided with an interference filter layer, which interference filter layers, when being in optical contact with each other, have a transmission for light projected onto the light valve in a wavelength range determined by the interference filter layers. This transmission differs from the transmission that would occur in the case where the interference filter layers are not in optical contact with each other.

18 Claims, 3 Drawing Sheets

LIGHT VALVE AND DEVICE PROVIDED WITH A LIGHT VALVE

The invention relates to a light valve for controlled transmission of light, the light valve comprising a first and a second element, at least one of which two elements is controllably movable into optical contact with the other element, and means for projecting light on the first of the two elements on the side remote from the second of the two elements.

The invention also relates to a device for displaying signals present in an electronic form, the device comprising a light source and a plurality of light valves for controlling the transmission of light emitted by the light source on the basis of the signals present in an electronic form.

A light valve and a device of this type are known from international patent application WO 99/28890. This document describes a device which is provided with a plurality of light valves, which device comprises a lamp, an optical waveguide and a movable foil. The optical waveguide captures the light until the optical waveguide is locally "touched" by the movable foil, so that the conditions for total reflection within the optical waveguide are locally lost. The combination of movable foil and optical waveguide constitutes a light valve at each position where the foil and the optical waveguide can be brought into contact with each other. The foil is brought into and out of contact with the optical waveguide by means of electrostatic forces which are generated by a modulated electric field generated by a matrix of electrodes on the optical waveguide and a matrix of counter electrodes on a facing transparent plate.

Although this principle is effective for systems which are laterally illuminated, i.e. coupling light into the optical waveguide from its edges, it does not work for light which propagates along the normal of the light valve.

It is an object of the invention to provide a light valve and a device provided with a light valve in which illumination from the rear is possible.

According to the invention, this object is achieved in a light valve in that each facing side of the elements is provided with an interference filter layer, which interference filter layers, when being in optical contact with each other, have a transmission for light projected onto the light valve in a wavelength range determined by the interference filter layers, which transmission differs from the transmission in the case where the interference filter layers are not in optical contact with each other.

Interference filter layers are also effective in the case where radiation is perpendicularly incident on the interference filter layers.

A device according to the invention is characterized in that one or more light valves as described hereinbefore are provided.

It is thereby achieved that a device according to the invention is capable of controlling the transmission of perpendicularly incident light. It is thereby achieved that the display performance as regards luminance and light efficiency is enhanced by means of rear illumination.

It is known per se that, by stacking dielectric layers, the transmission and reflection of the stacked layers can be chosen within preselected wavelength ranges of the light, which are understood to be ranges varying from infrared to ultraviolet. The subject of reflection and anti-reflection coatings is very well known. The relevant knowledge is used in, but does not form part of, the present invention. Where wavelength ranges are referred to in the foregoing, it should also be understood to be a specific wavelength.

The invention can be most easily understood by considering that a ¼λ layer provided on a surface ensures that light having the wavelength λ can enter or exit the relevant body. The function of this type of filters is based on a reflective stack of dielectric layers having alternately a high and a low refraction index and a thickness of ¼λ. Such an optical stack reflects light with a wavelength λ. The invention is based on the insight that when two of these stacks are placed behind each other and brought in optical contact a single layer of one ½λ thickness is created and the two stacks together transmit light with a wavelength λ. By moving the two stacks to and from each other the light can be switched and a controllable light valve is created. In this way, a light valve is formed which can switch for the wavelength λ between full transmission and full reflection, i.e. no transmission at all, for perpendicularly incident radiation.

Utilizing the knowledge about reflective and transmissive layered structures, light valves can thus be designed which can switch between full transparency and full reflection for a desired wavelength range around a given wavelength or are even limited to one specific wavelength by bringing the relevant layers into contact, or conversely, not into contact with each other.

A preferred embodiment of a light valve according to the invention is characterized in that at least one of the interference filter layers comprises a self-supporting multilayer interference foil.

Such multilayer interference foils are known per se and are preferably used in a light valve according to the invention.

It is thereby achieved that a separate support on which the interference filter layer is to be provided is not necessary, because the multilayer interference foil itself constitutes the interference filter layer.

These and other aspects of the invention are apparent from and will be elucidated with reference to the embodiments described hereinafter.

Light valves and devices for displaying signals which are present in an electronic form, comprising a light source and a plurality of light valves for controlling the transmission of light emitted by the light source on the basis of the signals present in an electronic form are known per se from, inter alia, U.S. Pat. No. 4,113,360, international application WO 97/31288, international application WO 98/19201 and the afore mentioned international application WO 99/28890. The details of such devices will not be further described, and the operation of the light valves as described in the above-mentioned state of the art is assumed to be known.

Figure 1A:
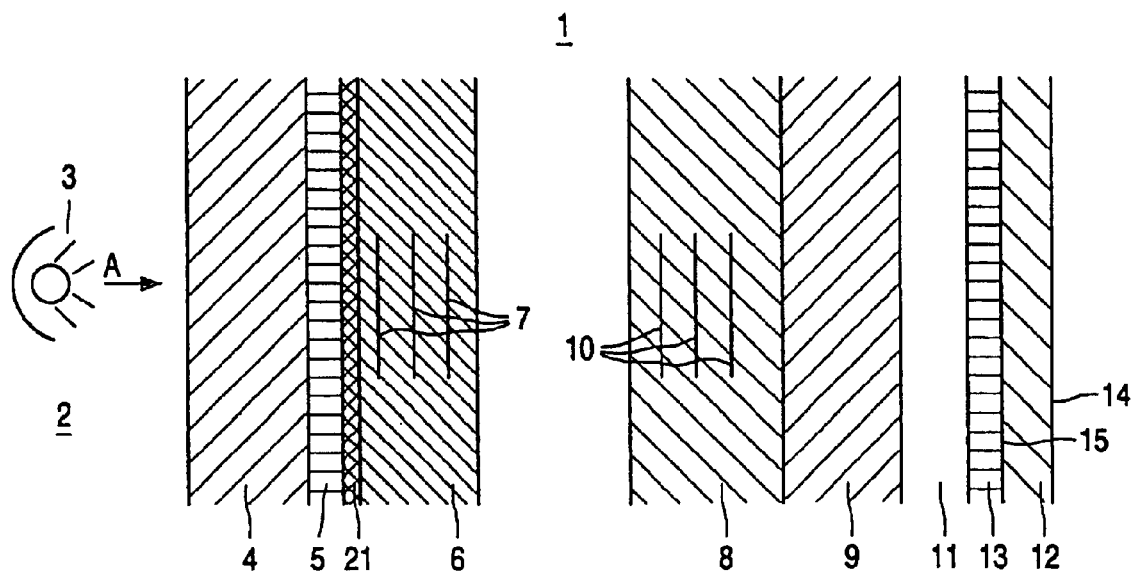
FIG. 1A is a diagrammatic cross-section of a light valve according to the invention, in a first state.
Figure 1B:
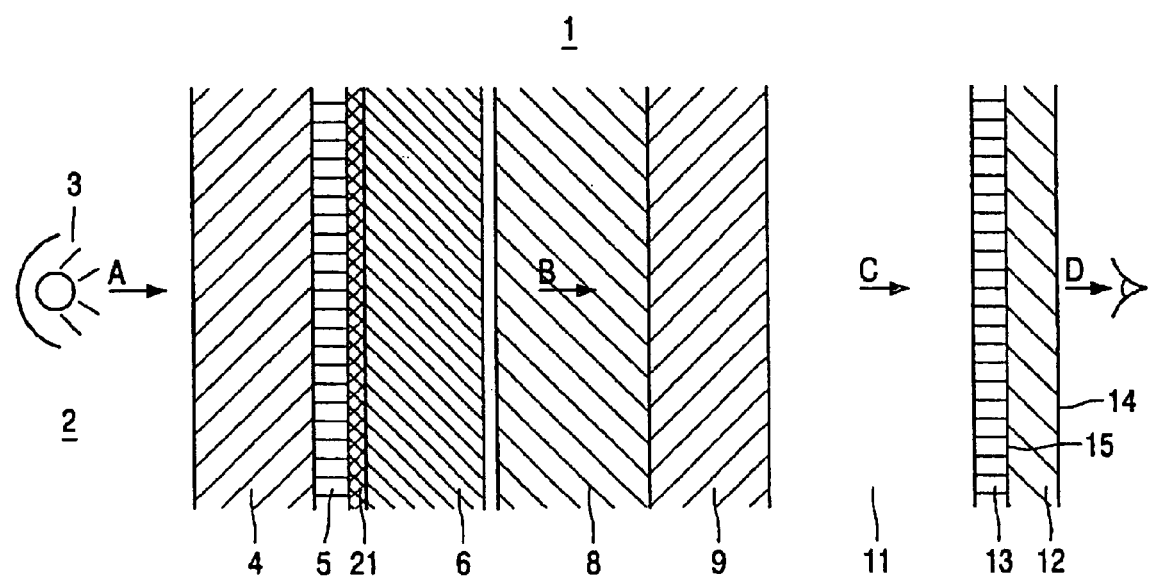
FIG. 1B is a diagrammatic cross-section of a light valve according to the invention, in a second state.

FIG. 1A shows a light valve 1 in a diagrammatic cross-section. The light valve 1 forms part of a device 2 for displaying signals which are present in an electronic form. The device 2 comprises a light source 3 which emits light towards the light valve 1, which light is incident substantially perpendicularly or only at small angles, for example maximally 30° different therefrom, as indicated by arrow A, on a transparent support 4 which forms part of the light valve 1. A transparent electrode of, for example, ITO, 5 is provided on the transparent support 4 in known manner. An interference filter layer 6 is provided on the electrode 5. The interference filter layer 6 may comprise in known manner a plurality of dielectric layers, which is diagrammatically indicated by means of the lines 7. Separated from the interference filter layer 6, a second interference filter layer 8 is provided on a transparent support 9. A foil having a thickness of not more than 5 micrometers is preferably used as a transparent support 9. The interference filter layer 8 may also be built up of a plurality of dielectric layers, which is indicated diagrammatically by means of lines 10. The support 9 with the interference filter layer 8 is flexible. Separated or not separated by a space 11 from the transparent support 9, an electrode 13 is provided on a transparent support 12. The electrode 13 may also be made of ITO. The side 14 of the transparent support 12 constitutes an exit of the light valve 1 and of the device 2. It is to be noted that the positioning shown for the electrode layers 5 and 13 between the transparent support 4 and the interference filter layer 6 on the side 15 of the support 12 is not crucial. As is known from the above-mentioned state of the art, the electrode layers 5 and 13 may be provided at different positions. However, it is crucial that the interference filter layers 6 and 8 face each other and can assume at least two positions, a first position in which they are not in contact with each other, as is shown in FIG. 1A, and a second position in which they are in contact with each other, as is shown in FIG. 1B.

Before continuing the general description of the invention, an embodiment will be elucidated.

In the embodiment shown in Table 1 the interference filter layer 6 comprises nine layers alternately consisting of $TiO_2$ and $SiO_2$, see Table 1, for a wavelenght of 530 nm.

TABLE 1

| Layer no. | Material | Physical thickness (nm) |
|---|---|---|
| 1 | $TiO_2$ | 56.38 |
| 2 | $SiO_2$ | 90.75 |
| 3 | $TiO_2$ | 56.38 |
| 4 | $SiO_2$ | 90.75 |
| 5 | $TiO_2$ | 56.38 |
| 6 | $SiO_2$ | 90.75 |
| 7 | $TiO_2$ | 56.38 |
| 8 | $SiO_2$ | 90.75 |
| 9 | $TiO_2$ | 56.38 |

The structure of interference layer 8 is shown in Table 1. Interference filter layer 8 also comprises an alternating succession of layers of $TiO_2$ and $SiO_2$.

Figure 5A:
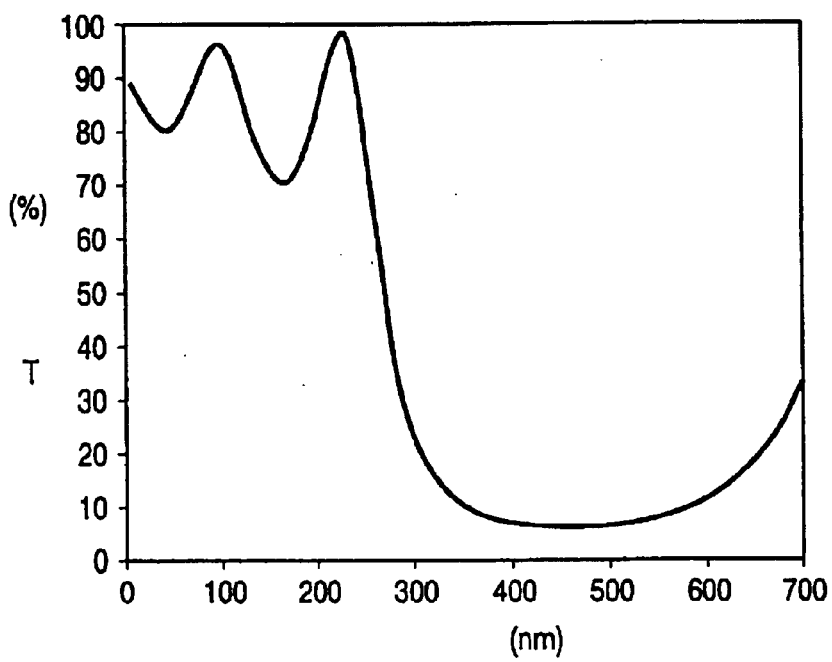
FIG. 5A is an example of the transmission of a light valve as a function of the wavelength when two specific interference filter layers are not in contact with each other.
Figure 5B:
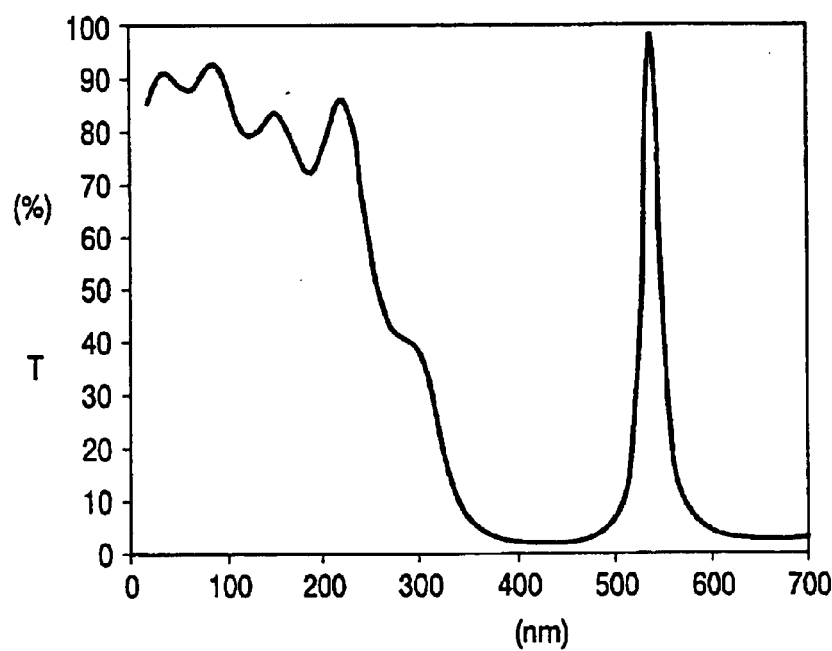
FIG. 5B is an example of the transmission of a light valve as a function of the wavelength when the interference filter layers of FIG. 5A are in contact with each other.

The layers 6 and 8 whose details are shown in Table 1 are not transparent to visible light if they are not in contact with each other, as is shown in FIG. 5A, whereas they have a narrow transmission band for green light if they are in contact with each other, as is shown in FIG. 5B.

In FIG. 1A, the single arrow A indicates that no light is transmitted in the interference filter layers 6 and 8 when they are not in contact with each other.

In FIG. 1B, the succession of arrows A, B, C and D indicates that the light valve is transparent in the interference filter layers 6 and 8.

In order to realize a satisfactory optical contact between the interference filter layers 6 and 8, it is recommendable to provide at least one of the interference filter layers 6 and 8 with a thin polymer film 21. The advantage of this polymer film 21 is that it is easily deformable. The thickness of the polymer film 21 is preferably chosen to be such that it forms part of the optical system, i.e. forming one of the layers which is decisive for the transmission characteristic of the layers 6 and 8. Very suitable polymers are based on cross-linked polydimethyl siloxane (silicone rubber n=1.43) or copolymers thereof with polymethylphenyl siloxane for adapting the refractive index to the desired value.

Figure 2:
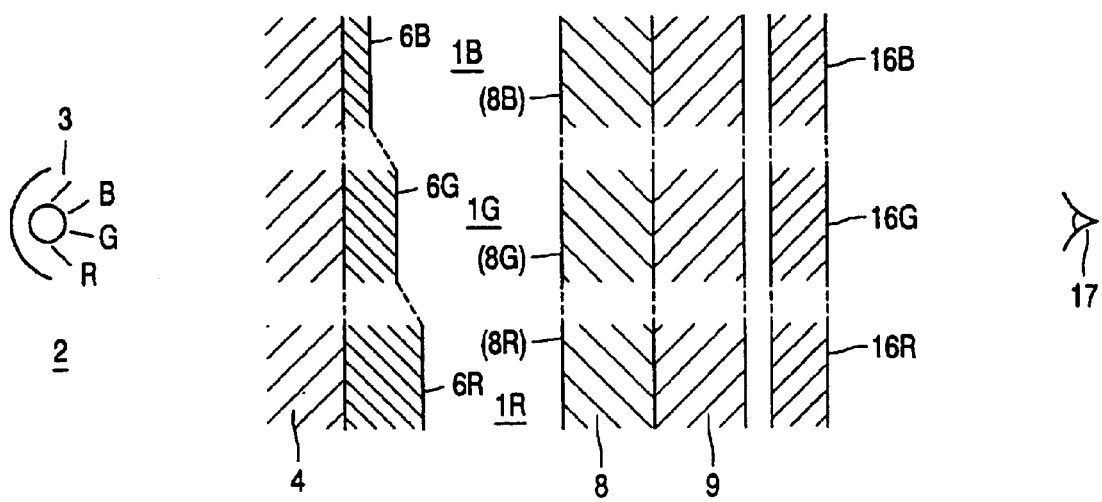
FIG. 2 is a diagrammatic cross-section of a plurality of juxtaposed light valves adapted to different colors of light.

FIG. 2 shows an example of a device 2 in which it is possible to visualize a multi-color image to an observer 17 by means of a strong light source 3 and by making use of the present invention. For the sake of clarity, FIG. 2 only shows the support 4, interference filter layers 6B, 6G and 6R, interference filter layer 8, transparent support 9 and color filters 16B, 16G and 16R.

Light source 3 emits a plurality of colors of light, for example, red R, green G and blue B. FIG. 2 further shows three different light valves, a light valve 1B, a light valve 1G and a light valve 1R. In the relevant example, interference filter layer 8 is a layer having a wide transmission band which passes all the visible light. For light valve 1B, an interference filter layer 6B is chosen which specifically passes blue light, for light valve 1G an interference filter layer 6G is chosen which passes green light only, and for light valve 1R, an interference filter layer 6R is chosen which passes red light only. The interference filter layers 6B, 6G and 6R are structured in known manner such that there is no transmission of light, when they are not in optical contact with the interference filter layer 8. The light valve 1B, 1G and 1R are regularly distributed in known manner on the surface of the device 2, of which FIG. 2 is a diagrammatic cross-section.

If the color rendition of the device shown in FIG. 2 is to be enhanced, each light valve 1B, 1G and 1R is associated with a known color filter 16B, 16G and 16R, respectively. By using color filters 16B, 16G and 16R, it is prevented that stray light of other colors coming from light valves 1B and 1G around the light valve 1R does not mix with the red light R required at the location of a pixel associated with filter 16R. The color filters 16B, 16G and 16R may be provided at any arbitrary location in the light path between the light source 3 and the observer 17, provided that they are associated with a relevant light valve 1B, 1G and 1R, respectively.

The width of the transmission bands of the interference filter layers 6 and the associated color filters 16 may be preferably chosen to be such that the width of the transmission band of each interference filter layer 6 is relatively large, combined with a very narrow transmission band of the color filter 16, or conversely.

In FIG. 2, the interference filter layers ensuring the color selection are provided on the transparent support 4, and an interference filter layer 8 co-operating with each interference layer on the transparent support 4 and ensuring the transmission is provided on the movable transparent support 9. It is of course also possible to provide the interference filter layer 8 on the transparent support 4 and to provide the color-selective interference filter layers on the transparent support 9. It is also possible to use narrow-band interference filter layers 8B, 8G and 8R, as is shown between brackets in FIG. 2, instead of a single interference filter layer 8. Then, a situation as described for green light in FIGS. 1A and 1B is created for each color of blue light B, green light G and red light R in each light valve 1B, 1G and 1R, respectively. Due to the narrow-band property of the combined interference filter layers 6 and 8 and the color filters 16B, 16G and 16R, a considerable color saturation is achieved.

Figure 3:
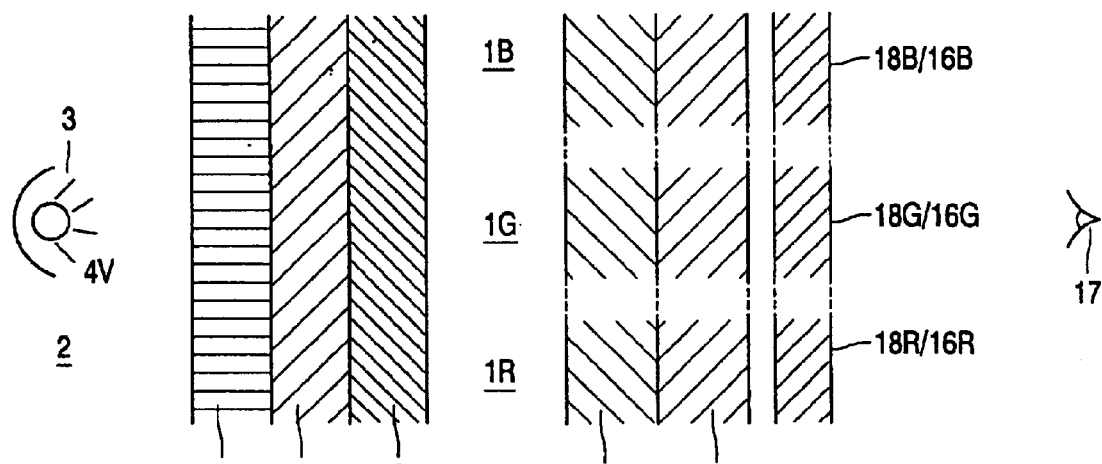
FIG. 3 is a diagrammatic cross-section of a plurality of juxtaposed light valves forming part of a device according to the invention.

FIG. 3 shows a further embodiment of a device according to the invention, in which the light source 3 emits ultraviolet light. Again, a collimator 19 is provided and the interference filter layers 6 and 8 have a uniform composition throughout the surface of the device 2. The interference filter layers 6 and 8 have a narrow band and are adapted to a peak in the ultraviolet spectrum of the light source 3. In FIG. 3, phosphors 18B, 18G and 18R are provided in a known, regular manner on the right-hand side of the interference filter layer 8. Under the influence of the ultraviolet light emitted by the light source 3 and transmitted by the light valves 1B, 1G and 1R, the phosphors 18B, 18G and 18R luminesce in the colors blue B, green G and red R, respectively. Although the collimator 19 is shown in FIG. 3 on the left-hand side of the transparent support 4, it is alternatively possible to position the collimator 19 in FIG. 3 on the right-hand side of the interference filter layer 8 but on the left-hand side of the phosphors 18B, 18G and 18R.

In the embodiments of FIGS. 2 and 3, it is of course also possible to work with either fewer or more colors than the three colors blue B, green G and red R shown.

For another embodiment of the invention, reference is also made to FIG. 3. In this embodiment to be described hereinafter, color filters 16B, 16G and 16R are arranged in known manner between the light source 3 and an exit of the device 2. Moreover, the interference filter layers 6 and 8 are dimensioned in known manner so that they pass light of a first color when they are not in contact with each other and pass light of a second color when they are in contact with each other. For example, the first color is blue and the second color is red for light valve 1B, the first color is green and the second color is blue for light valve 1G and the first color is red and the second color is blue for light valve 1R. It is important that the second color is different from the first color. The combination of the light valve with the color filter also ensures that a light valve each time passes light of a first color which is the same as the light of the color which is also passed by the relevant color filter associated with the light valve, and that this light of the second color is not passed by the relevant color filter when this light valve passes light of the second color.

To prevent the transparent supports 4 and 9 from functioning as optical waveguides, or from hiding the lamp structure of the light source 3, scattering may be added in at least one of the transparent supports 4, 9 and 12.

Figure 4:
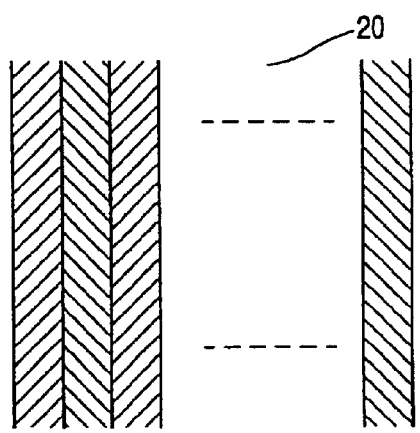
FIG. 4 is a diagrammatic cross-section of a multilayer interference foil.

The foregoing description as well as the above-mentioned prior art, is based on the recognition that the interference filter layer 8 is provided on a support 9. However, multilayer interference foils of, for example, the firm of 3M are also known, which foils alternately consist of two or more foil layers which are transparent to visible light, have an optional thickness and different refractive indices. When these conditions are met, such a foil forms an interference filter layer for visible light. Such an interference filter layer is self-supporting due to its foil properties and, if used as an interference filter layer 8, does not have to be provided on a separate transparent support 9. Use of such a foil simplifies the mechanical structure of a light valve 1 and a device 2. Such a foil is shown diagrammatically in FIG. 4 and is denoted by reference numeral 20.

A further embodiment of an interference filter layer is constituted by a layer consisting of an array of cholesteric liquid crystals. These crystals constitute a layered structure which gives rise to interference of light waves incident on this structure. The mutual distance between the layers in the layered structure may be modified under the influence of an applied electric field. In this way, it is possible to create a light valve which, as an interference filter layer, comprises at least a cholesteric liquid crystal layer which may have a transmission peak at a desired location in the spectrum under the influence of an electric field. Dependent on the choice and the location of the transmission peak, there is transmission or no transmission of light with a specific wavelength.

After the foregoing, many possibilities for which the present invention can be realized and applied will be evident to those skilled in the art. All of these embodiments are considered to be within the protective scope of the appendant claims.

What is claimed is:

1. A light valve for controlled transmission of light, the light valve comprising a first element and a second element, at least one of which two elements is controllably movable into optical contact with the other element, and means for projecting light on the first of the two elements on the side remote from the second of the two elements, wherein each facing side of the elements is provided with an interference filter layer, which interference filter layers, when being in optical contact with each other, have a transmission for light projected onto the light valve in a wavelength range determined by the interference filter layers, which transmission differs from the transmission in the case where the interference filter layers are not in optical contact with each other.

2. The light valve of claim 1, wherein at least one of the interference filter layers comprises a self-supporting multilayer interference foil.

3. The light valve of claim 2, wherein the self-supporting multilayer interference foil comprises self-organized liquid crystals.

4. The light valve of claim 1, wherein the controllably movable element comprises a foil on which an interference filter layer is provided.

5. The light valve of claim 4, wherein the foil is transparent.

6. The light valve of claim 4, wherein the foil is light-scattering.

7. The light valve of claim 1, wherein at least one of the interference layers is provided on a support, and a polymer film is provided between the Interference filter layer and the support.

8. The light valve of claim 7, wherein the polymer film is based on cross-linked polydlmethyl siloxane.

9. The light valve of claim 8, wherein the polymer film is based on one or more copolymers of cross-linked polydimethyl slioxane with polymethylphenyl siloxane.

10. A device for displaying signals present in an electronic form, the device comprising a light source and a plurality of light valves for controlling the transmission of light emitted by the light source on the basis of the signals present in an electronic form, wherein at least one of the plurality of light valves is the light valve of claim 1.

11. The device of claim 10, wherein, in operation, the light source emits light which is suitable for causing a phosphor to luminesce, and, for at least a plurality of light valves, a phosphor to be brought to luminescence is provided in the light path from the light source up to and including an image exit of the display device.

12. The device of claim 11, wherein the light emitted by the light source in operation has a blue color, and the phosphor to be brought to luminescence luminesces in visible light different from blue.

13. The device of claim 12 including at least three of said light valves of claim 1, wherein a first and a second phosphor are present, which first phosphor luminesces in red and which second phosphor luminesces in green, and, of the three of said light valves of claim 1, one is present without a phosphor, one is present with a green luminescing phosphor and one is present with a red luminescing phosphor.

14. The device of claim 11, wherein the light emitted by the light source in operation has an ultraviolet color, and the phosphor to be brought to luminescence luminesces in visible light.

15. The device of claim 14 including at least three of said light valves of claim one, wherein a first, a second and a third phosphor are present, which first phosphor luminesces in red, the second phosphor luminesces in green and the third phosphor luminesces in blue, and, of the three of said light valves of claim 1, one is present with a red-luminescing phosphor, one is present with a green-luminescing phosphor and one is present with a blue-luminescing phosphor.

16. The device of claim 10, wherein each of said plurulity of light valves is provided with a color filter having a transmission spectrum corresponding to the transmission spectrum of its respective light valve, and the color filters are provided in the light path from the light source up to and including an image exit of the device.

17. The device of claim 16, wherein each of said plurality of light valves is switchable between a first narrow-band transmission spectrum and a second narrow-band transmission spectrum, in that the narrow-band transmission spectra do not overlap each other, and for each light valve the transmission spectrum of the associated color filter corresponds to only one of the two narrow-band transmission spectra.

18. The device of claim 16, wherein the light source is multi-colored, and color filters of at least two different colors are provided.

* * * * *